US006885441B2

United States Patent
Brendel

(10) Patent No.: US 6,885,441 B2
(45) Date of Patent: Apr. 26, 2005

(54) OPTICAL SPECTRUM ANALYZER BASED ON TIME-OF-FLIGHT MEASUREMENT AND ITS IMPLEMENTATION FOR PMD TESTING IN OPTICAL FIBERS

(75) Inventor: Jürgen Brendel, Geneva (CH)

(73) Assignee: Sunrise Luciol Sarl, Mies (CH)

( * ) Notice: Subject to any disclaimer, the term of this patent is extended or adjusted under 35 U.S.C. 154(b) by 25 days.

(21) Appl. No.: 10/383,337

(22) Filed: Mar. 7, 2003

(65) Prior Publication Data

US 2004/0174517 A1 Sep. 9, 2004

(51) Int. Cl.[7] .............................................. G01N 21/00
(52) U.S. Cl. .................................................... 356/73.1
(58) Field of Search ............................ 356/73.1; 385/3, 385/27, 24, 147; 398/154–161, 173–177; 250/225

(56) References Cited

U.S. PATENT DOCUMENTS 5,995,228 A * 11/1999 Otani et al. .................. 356/364
6,771,361 B1 * 8/2004 Araki et al. ................ 356/73.1
6,778,730 B1 * 8/2004 Hironishi ..................... 385/24

* cited by examiner

Primary Examiner—Tu T. Nguyen
(74) Attorney, Agent, or Firm—Moetteli & Associes Sarl; John Moetteli

(57) ABSTRACT

An instrument for measuring chromatic dispersion, polarization mode dispersion and spectral attenuation comprising a chromatic dispersion analyzer based on the photon-counting time-of-flight technique, a fixed analyzer (polarizer) for PMD measurement, an optical switch placed in front of the photon-counting detector to change the measurement mode between chromatic dispersion, PMD, and spectral attenuation testing, respectively. The object of the invention is to provide an optical spectrum analyzer which uses most of the components already present in a time-of-flight based chromatic dispersion analyzer for optical fibers. Integrating select components to this chromatic dispersion analyzer then highly increases the measurement capabilities of this instrument.

6 Claims, 1 Drawing Sheet

OPTICAL SPECTRUM ANALYZER BASED ON TIME-OF-FLIGHT MEASUREMENT AND ITS IMPLEMENTATION FOR PMD TESTING IN OPTICAL FIBERS

BACKGROUND OF THE INVENTION

This invention generally relates to the field of fiber optic test and measurement, and more particular to an instrument for measuring optical spectra.

In general, optical spectra are measured using either a tunable filter or a spatially dispersing element where the deflection angle is a function of the wavelength. The dispersing element is in general a prism or a grating such that for each wavelength a certain angle of deflection is defined. Both possibilities require mechanical tuning of the element or a detector array for analyzing the optical spectrum.

Dispersion in optical materials can, as described above, be transformed into a wavelength dependent spatial intensity distribution. Another consequence of dispersion is a wavelength dependent distribution of the transmission times through the dispersive media, the so called chromatic dispersion.

Optical spectra can therefore also be measured by monitoring the time of flight of an optical pulse through the dispersive element. In order to provide sufficient chromatic dispersion the dispersive element has to be very long which seems to make the realization of an instrument of this kind impossible. On the other hand recent developments of optical fibers and fiber optical components open a way towards this approach of a temporal spectrometer.

The advantage of this kind of spectrometer is that it does not need any mechanical tuning and calibration and that it can be implemented in an "all fiber approach" i.e. the light never has to leave the optical fiber. This allows the easy implementation of this spectrometer into other instruments allowing e.g. the realization of a universal test instrument for chromatic dispersion, polarization mode dispersion (PMD) and spectral attenuation.

SUMMARY OF THE INVENTION

An instrument is provided for measuring the spectral distribution of optical signals. The instrument is composed of a dispersing element where time-of-flight is a function of the wavelength, a fast optoelectronic receiver, a reference synchronization (clock) circuit and time interval analyzer circuit which measures time delays between the clock and the receiver unit. Further, a universal instrument is provided enabling the measurement of chromatic dispersion, PMD, and spectral attenuation. This universal instrument is based on the photon-counting time-of-flight technique, which provides a high temporal resolution even at very low light levels. This detection technique, together with the dispersive element, is the basic component of the spectrometer part of the instrument. Adding a polarizer in front of the detector allows performing polarization mode dispersion (PMD) measurement based on the so-called fixed analyzer technique. Finally, the same detection technique is needed for chromatic dispersion measurement based on the direct time-of-flight method.

The primary object of the invention is to provide an optical spectrum analyzer, which uses most of the components already present in a time-of-flight based chromatic dispersion analyzer for optical fibers. Adding select components to this chromatic dispersion analyzer then highly increases the measurement capabilities of this instrument.

Another object of the invention is to add optical spectrum analyzer functions to this instrument to enable spectral attenuation measurement in optical fibers.

Another object of the invention is to add optical spectrum analyzer functions to this instrument to enable polarization mode dispersion (PMD) measurement in optical fibers using the fixed analyzer technique.

Another object of the invention is to provide one small size low weight and low cost instrument that allows testing chromatic dispersion, polarization mode dispersion and spectral attenuation in optical fibers.

Other objects and advantages of the invention will become apparent from the following descriptions, taken in connection with the drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
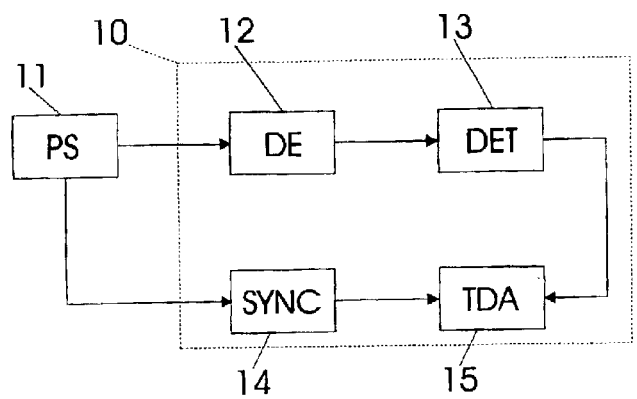
FIG. 1 is a schematic diagram illustrating the operation of the spectrum analyzer of the invention, as an independent device.

Referring to FIG. 1, an embodiment of the invention as an optical spectrum analyzer is described. In this embodiment, the instrument 10 includes a temporal dispersing element (DE) 12, an optoelectronic detector/receiver (DET) 13, a synchronization circuit (SYNC) 14, also known as a reference clock generation circuit, and an electronic time interval measurement circuit (TDA) 15.

The light source or filtered light source under test (PS) 11 can either be a pulsed light source or a continuous light source. In the case of a pulsed light source, the synchronizing circuit 14 is passing the clock signal of the source directly to the time interval measurement circuit 15. In the second case of a continuous light source, the synchronizing circuit 14 is generating the clock signal itself. This signal then also controls an optical shutter (not shown) used to modulate the light source 11. This shutter can be an electro-optical or an acousto-optical modulator or other devices allowing the generation of sufficiently short optical pulses.

The dispersing element 12 can be considered a variable delay line whose delay depends on the wavelengths of the transmitted signal. Each optical fiber used for telecommunications has this property known as chromatic dispersion. In the preferred embodiment, the dispersing element 12 is a dispersion compensating module (DCM) whose relative group delay as a function of the optical wavelength is exactly known. Typical chromatic dispersion values are about 1500 ps/nm. Assuming a detected pulse width of 300 ps the spectral resolution of this optical spectrum analyzer will be about 0.2 nm.

From the measured time interval distribution between the clock of the synchronizing circuit 14 and the signal of the optoelectronic detector 13, the wavelength of the source 11 and its spectral distribution can be deduced.

Instead of transforming the wavelength information into spatial information, i.e. the deflection angle caused by the dispersing element, the invention uses another kind of dispersing element, which transforms the wavelength information into a time-of-flight information. The challenge in implementing this method is the lack of small-sized temporal dispersion elements providing sufficient dispersion. The same elements are also needed to compensate chromatic dispersion in optical fibers for high speed data transmission. There are several new developments of such dispersion compensation modules (DCM) including high dispersion fibers, virtually imaged phased arrays, long length fiber Bragg-gratings and others which can be used as components of the spectrum analyzer. Also, the optoelectronic circuit needed to analyze short time delays can in general not be implemented using standard low cost solutions. The preferred detection technique is therefore the photon counting technique.

A spectrometer of this type requires state of the art time-of-flight measurement electronics, optical fibers of several km lengths or relatively high cost DCM's to achieve reasonable spectral resolutions. This may limit its application as an independent instrument. On the other hand, almost all of the components described above are already present in a chromatic dispersion analyzer based on time-of-flight measurements. Therefore, it is a relatively simple modification to include the above-described temporal spectrometer in this kind of chromatic dispersion analyzer.

Characterization of optical communication fiber links requires, among other parameters, precise knowledge of chromatic dispersion, polarization mode dispersion and spectral attenuation properties of the optical fiber. Adding spectrum analyzer functions to a chromatic dispersion analyzer will transform it into a universal instrument capable of testing all above-mentioned parameters. The invention therefore provides a time saving and low cost solution for optical fiber characterization.

Figure 2:
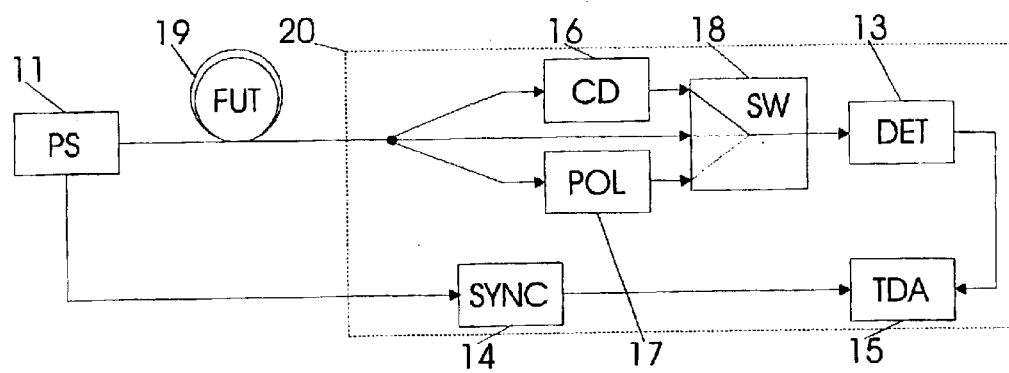
FIG. 2 is a schematic diagram illustrating a universal instrument of the invention, capable of measuring chromatic dispersion, PMD and spectral attenuation in optical fibers, wherein the dispersing element is the fiber under test.

Referring to FIG. 2, an embodiment of the invention as a universal instrument 20 is shown. This instrument 20 is a retrofit to a typical time-of-flight chromatic dispersion analyzer.

The additional elements are the optical switch (SW) 18 and the polarizer (POL) 17. Note again that all other elements are already fundamental parts of a chromatic dispersion analyzer based on time-of-flight measurement.

The pulsed light source (PS) 11 is now the source of the chromatic dispersion analyzer. This source 11 consists of a broadband LED pulsed at regular intervals with a typical pulse-width of about 0.3–1 ns. For synchronization, the clock pulse of this LED is transmitted to the receiver unit through the optical fiber under test. The dispersing element (DE) is the optical fiber under test (FUT) 19. An optical switch (SW) 18 in front of the detector (DET) 13 is used to change the measurement mode of the instrument. When this switch 18 is set to its upper position, the optical signal passes through the components necessary to measure the chromatic dispersion of the fiber (CD) 16. The choice of the component 16 will depend on the type of chromatic dispersion analyzer. In general, component 16 will be a tunable filter or a set of filters to perform a measurement of the relative group delay of the fiber under test as a function of the wavelength. The result of this measurement of the chromatic dispersion is, in a second step, used to calibrate the temporal optical spectrum analyzer. Inverting the fitting function found by the chromatic dispersion analyzer, i.e. the dependence of the relative group delay on the wavelength, one obtains the measured wavelength from the measured time delay.

When setting the switch 18 to its middle position, the first of the additional measurement capabilities given by the present invention is enabled. The instrument now works as an optical spectrum analyzer on the broadband LED source, filtered by the fiber under test. Subtracting this spectrogram from the initial spectrogram of the LED yields the spectral attenuation of the fiber under test.

When setting the switch 18 to its lower position, the second of the additional measurement capabilities is enabled. The instrument again works as an optical spectrum analyzer but now on the incoming broadband LED light polarized by the polarizer (POL) 17. This setting is used to measure the polarization mode dispersion of the fiber under test. The measurement principle is called the fixed analyzer technique. This technique is recommended by the International Telecommunication Union (ITU) and is described in detail under recommendation G.650 (5.7.4), the contents of which are incorporated by reference hereto.

Figure 3:
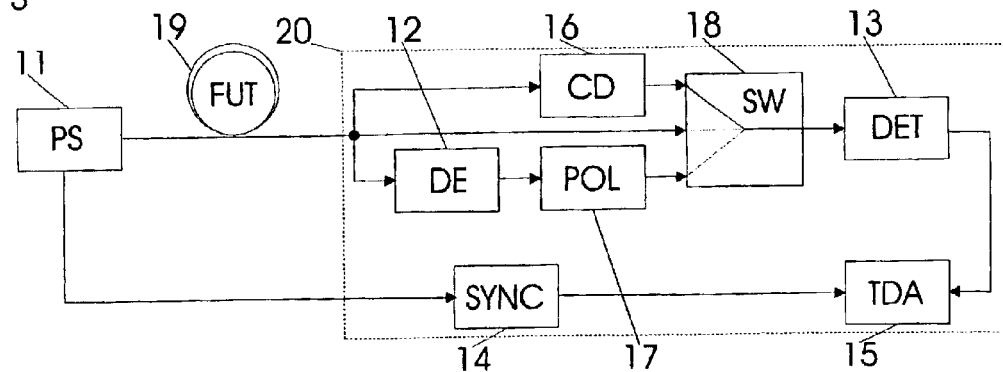
FIG. 3 is a schematic diagram illustrating a universal instrument of the invention, capable of measuring chromatic dispersion, PMD and spectral attenuation in optical fibers, wherein the dispersing element is the fiber under test together with a second element included in the instrument.

Referring now to FIG. 3, an embodiment of the invention identical to that shown in FIG. 2, except that the dispersing element is the aggregate of the fiber under test 19 together with a second dispersing element 12, included in the instrument.

Detailed descriptions of the preferred embodiment have been provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An instrument for measuring optical spectra of a light source under test, wherein the instrument includes
   (a) a dispersing element, which produces a defined optical delay as a function of the wavelength, and,
   (b) an optical time-of-flight measurement device, which comprises an optical receiver, an electronic time interval measurement circuit, and a reference clock generating circuit,
   wherein the optical receiver, the electronic time interval measurement circuit, and the reference clock generating circuit are operatively connected together in series and wherein the dispersing element and the reference clock generating circuit are operatively connectable to the light source under test.

2. The instrument of claim 1 wherein said dispersing element is a single mode optical fiber.

3. The instrument of claim 1 wherein said dispersing element is a fiber optical Bragg-grating.

4. The instrument of claim 1 wherein said dispersing element is a virtually imaged phased array.

5. The instrument of claim 1 wherein said optical receiver and electronic time interval measurement circuit are based on photon-counting time-of-flight technology.

6. An instrument for measuring optical spectra of a light source under test, wherein the instrument:
 (a) is connectable to a dispersing element which produces a defined optical delay as a function of the wavelength, and,
 (b) includes an optical time-of-flight measurement device, which comprises an optical receiver, an electronic time interval measurement circuit, and a reference clock generating circuit, operatively connected together in series;

wherein the optical receiver and the reference clock generating circuit are operatively connectable to the dispersing element and the light source under test, respectively.

* * * * *